E. IKEDA.
METHOD OF MANUFACTURING TIRES.
APPLICATION FILED AUG. 5, 1918.

1,319,003.

Patented Oct. 14, 1919.

Inventor
Etsutaro Ikeda.
By B. Singer,
His Attorney

UNITED STATES PATENT OFFICE.

ETSUTARO IKEDA, OF TOKYO, JAPAN.

METHOD OF MANUFACTURING TIRES.

1,319,003.   Specification of Letters Patent.   Patented Oct. 14, 1919.

Application filed August 5, 1918. Serial No. 248,496.

*To all whom it may concern:*

Be it known that I, ETSUTARO IKEDA, a subject of the Emperor of Japan, residing at Tokyo, Japan, have invented new and useful Improvements in Methods of Manufacturing Tires, of which the following is a specification.

My invention relates to the method of cheaply manufacturing wheel tires out of paper. The tubes form tubular endless rings, made of Japanese papers and hydrosme paste. Their inner and outer surfaces are painted with alcoholic solution of resin and shellac and with a thick solution of india rubber.

To illustrate my invention I have appended hereto a sheet of drawings in which:—

I primarily mix a paste, known as hydrosme paste, composed of one part of flour of hydrosme root and twenty-five parts of water. I then take several sheets of paper, known as Japanese paper, and cause them to adhere one to the other by coating with the above paste so as to construct a thick and tough sheet of fabric. This sheet is then cut into smaller strips such as 1, 2, 3 and 4.

Figure 1:
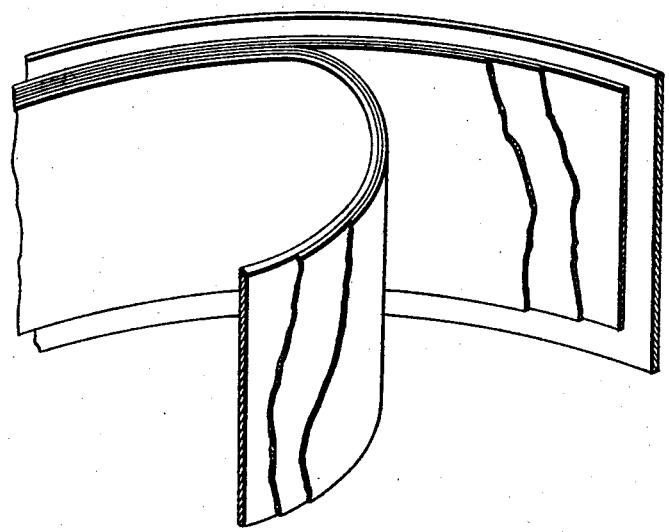
Figure 1 is a plane view of the assembled carcass which forms a tubular endless ring but which, in this view, has been cut through to more clearly illustrate my invention.

In now constructing the tires the sheet 1, as shown in the drawing, is made larger than any of the other pieces, such as 2 and 3, which are of equal width, but it will be noted that the thickness of the sheet 3 is equivalent to the thickness of both the pieces 1 and 2, which additional thickness may be secured by simply pasting two strips together, or any other convenient manner. As shown in Fig. 1, the abutting faces of the strips 2 and 3 are painted with a solution of three parts of resin and one part of shellac dissolved in six parts of alcohol and dried, to form a coating 5. Over this coating an additional coating 6 is provided which coating is composed of a thick solution of india rubber dissolved in a proper solvent, for example, carbon disulfid and vulcanized after the same has been painted onto the surface 5.

Figure 2:
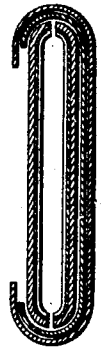
Fig. 2 is a section of the deflated tube prior to its finished condition, showing the assembling of the various elements.
Figure 3:
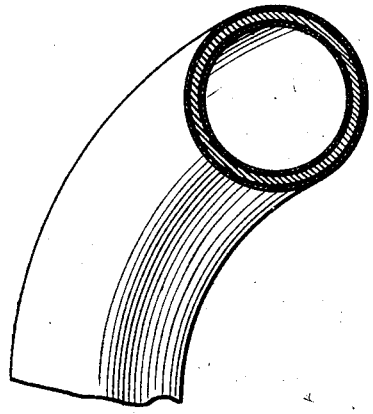
Fig. 3 is a sectional elevation of the finished product.

Having constructed the crude carcass for the tire by means of pasting the layer 2 to the layer 1 and the layer 3 to the layer 2 along their edges, as indicated in Fig. 2, the edges of the larger piece 1 are caused to overlap the joint formed between the pieces 2 and 3, as also indicated in Fig. 2, and a further piece of material 4, similar to the material composing sheets 1, 2 and 3, is caused to adhere to the whole, so as to form a tubular endless ring. The outer surface of the tube thus formed is coated with an additional layer 5 of resin and shellac, upon the outer surface of which the india rubber solution 6 is applied, in the manner mentioned above.

It will be noted that in this method no alkali solution is utilized which might react upon the hydrosme paste. My method enables a tire for bicycles or automobiles to be constructed in the most convenient, efficient and cheap manner. The hydrosme paste eliminates all danger of the pieces of paper separating at the joint or hardening of any parts and further, makes the coating of the india rubber solution uniform. This latter coating does not permit of the entrance of any moisture, thus preventing any dissolving of the hydrosme paste.

Having thus described my invention, what I claim is:—

1. The method of manufacturing wheel tire tubes which consists in forming tubular endless rings made of Japanese papers and hydrosme paste coating the same with alcoholic solution of resin and shellac upon which is applied a thick solution of india rubber, on both the inner and outer surfaces.

2. The method of manufacturing wheel tire tubes which consists in forming tubular endless rings comprising tough paper pieces and hydrosme paste, such pieces being composed of several sheets of Japanese paper painted with alcoholic solution of resin and shellac to form a coating, and again with a thick solution of india rubber to form another coating, and a further piece of paper constructed in a like manner to which one of the pieces aforementioned is adapted to be caused to adhere, the top paper pieces being secured together along their marginal edges whereby to form a joint, and a final piece of paper adapted to be positioned over such joint to protect the same, the outer surface of the tube thus formed being painted with an alcoholic solution of resin and shellac to form a coating over which is applied a solution of india rubber to form an additional coating which is waterproof.

3. The method of manufacturing wheel tire tubes which consists in forming tubular endless rings made of Japanese paper and a paste composed of one part of flour of hydrosme root and twenty-five parts of water, coating the rings with alcoholic solution of resin and shellac upon which is applied a thick solution of india rubber, upon both the inner and outer surfaces.

ETSUTARO IKEDA.

Witnesses:
　DARSABARO MOCHIZUKI,
　THOMAS C. SMITH.

Copies of this patent may be obtained for five cents each, by addressing the "Commissioner of Patents, Washington, D. C."